Figure 4:
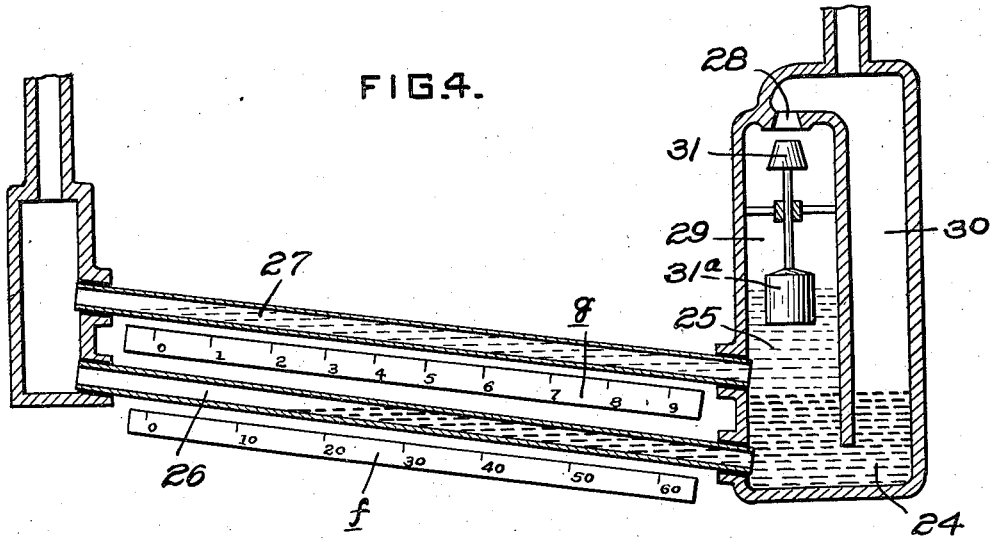

July 1, 1924.  
H. BACHARACH  
GAUGE  
Filed March 14, 1921  
1,499,759  
5 Sheets-Sheet 1
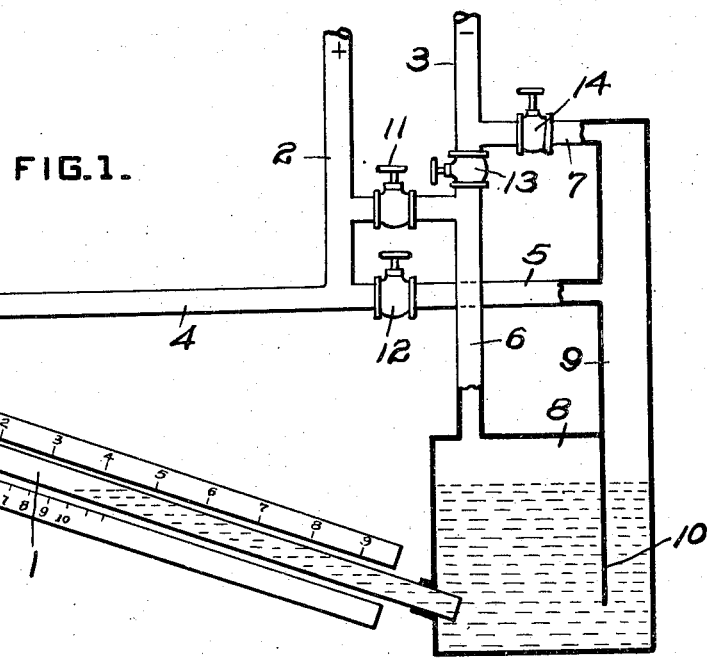
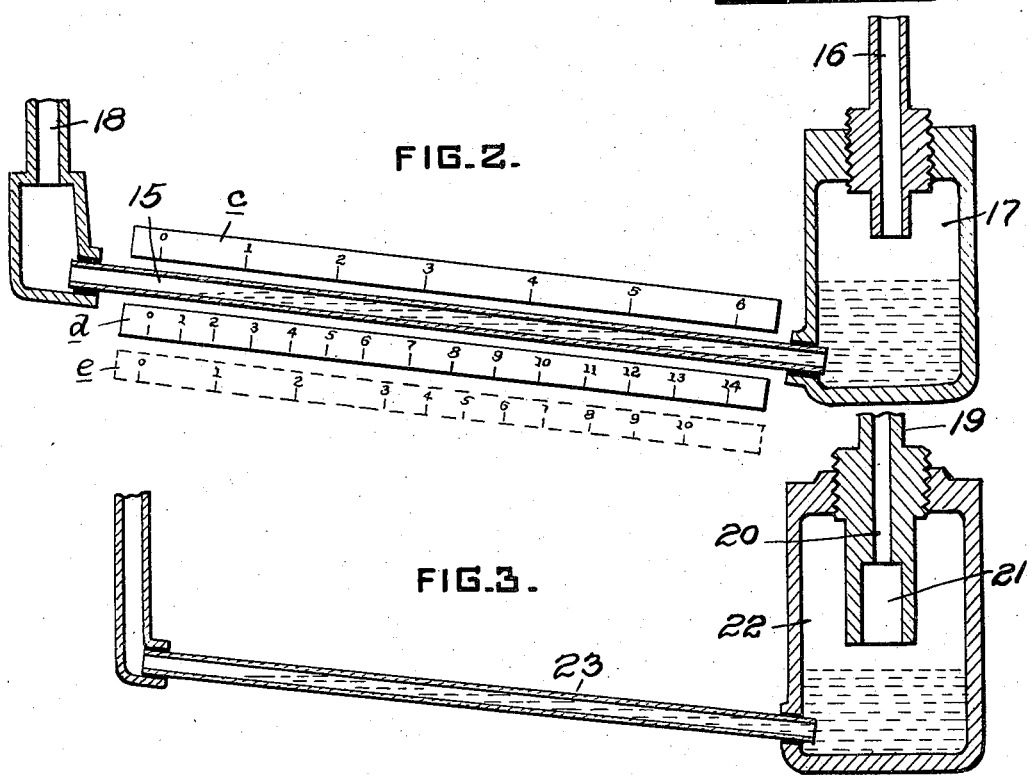
INVENTOR  
Herman Bacharach  
by James C. Bradley  
atty July 1, 1924.

H. BACHARACH

GAUGE

Filed March 14, 1921

1,499,759

5 Sheets—Sheet 2

INVENTOR
Herman Bacharach
by
James C. Bradley
atty

July 1, 1924.

H. BACHARACH

GAUGE

Filed March 14, 1921

1,499,759

5 Sheets-Sheet 3

INVENTOR
Herman Bacharach
by
James C. Bradley
Atty.

July 1, 1924.

H. BACHARACH

GAUGE

Filed March 14, 1921    5 Sheets-Sheet 4

1,499,759

INVENTOR
Herman Bacharach
by
James C. Bradley
atty

July 1, 1924.
H. BACHARACH
GAUGE
Filed March 14, 1921    5 Sheets-Sheet 5
1,499,759
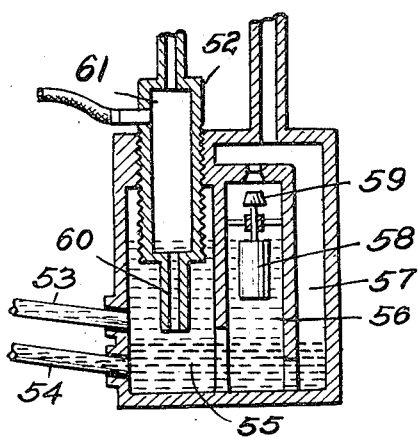
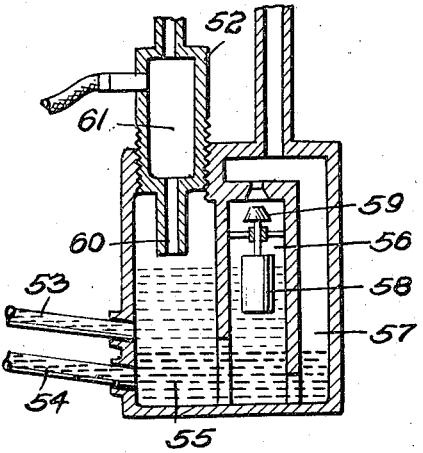
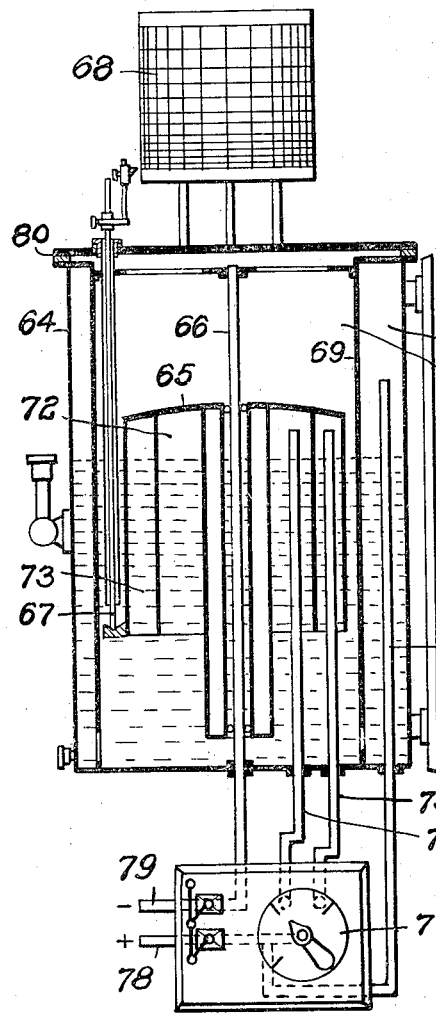
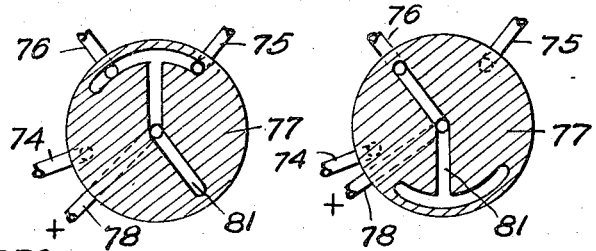
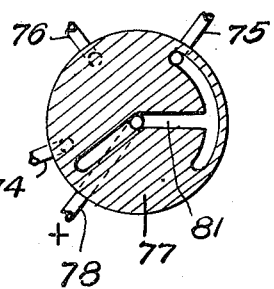
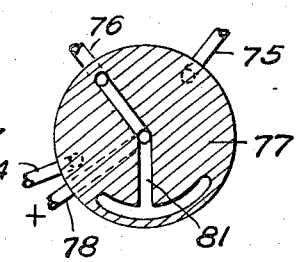
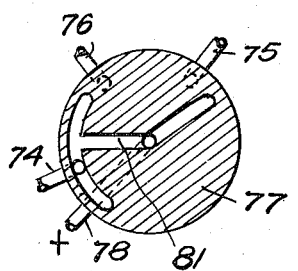
INVENTOR
Herman Bacharach,
by
James C. Bradley.
atty.

Patented July 1, 1924.

1,499,759

UNITED STATES PATENT OFFICE.

HERMAN BACHARACH, OF PITTSBURGH, PENNSYLVANIA, ASSIGNOR TO BACHARACH INDUSTRIAL INSTRUMENT COMPANY, A CORPORATION OF PENNSYLVANIA.

GAUGE.

Application filed March 14, 1921. Serial No. 452,276.

*To all whom it may concern:*

Be it known that I, HERMAN BACHARACH, a citizen of the United States, and a resident of Pittsburgh, in the county of Allegheny and State of Pennsylvania, have made a new and useful Invention in Gauges, of which the following is a specification.

The invention relates to gauges. It has for its principal object the provision of an improved gauge construction for giving a plurality of ranges for the indicating device, whether such device be in the form of a liquid in a transparent tube or in the form of a pointer or pencil moved by a float or equivalent device under the influence of liquid to which pressure is applied, to the end that a wide range of pressures may be satisfactorily read by the use of a single gauge, thus avoiding the requirement of a plurality of different instruments to meet varying conditions. The indicating device oftenest employed is an inclined glass tube in order to magnify the movement of the liquid, but other tube arrangements may be employed, as well as pressure operated pointers, pencil recorders and a wide range of other pressure operated devices known in the art. In order to indicate the scope of the invention a considerable number of different embodiments of the invention are illustrated, but it will be understood that these do not by any means comprehend the possibilities of modification. The apparatus may be employed to measure either pressures or flows and to measure such pressures and flows both in gases and liquids.

Stated somewhat differently the improved gauges or manometers accomplish the function of obtaining with a single device a practically unlimited number of measuring ranges. In their various forms (certain of which are illustrated and described later) these devices may indicate or record either simultaneously or alternately, by the use of specially designed valves, or by the use of liquids of different specific gravity, a number of pressures or volumes of the same or different range.

Among the practical applications of the apparatus are the following: (1) to indicate or record the draft in a boiler furnace at various places, as well as the forced or induced draft as furnished by a fan; (2) to indicate or record the drafts and air pressures prevailing at various places in a regenerating furnace, and the pressure and volume of fuel gas delivered to the furnace; and (3) to indicate or record the flow of gases in a ventilating system.

Figure 5:
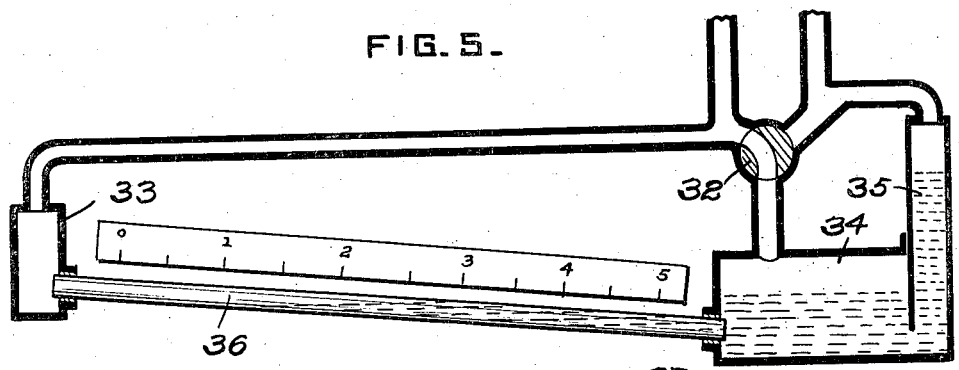
Figure 6:
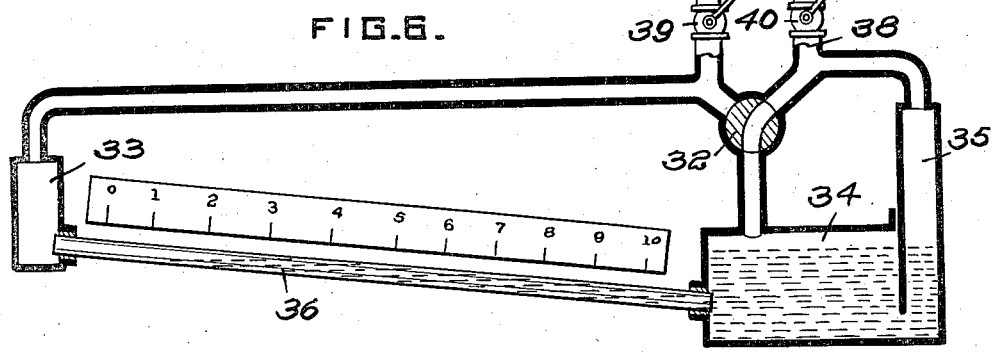
Figure 7:
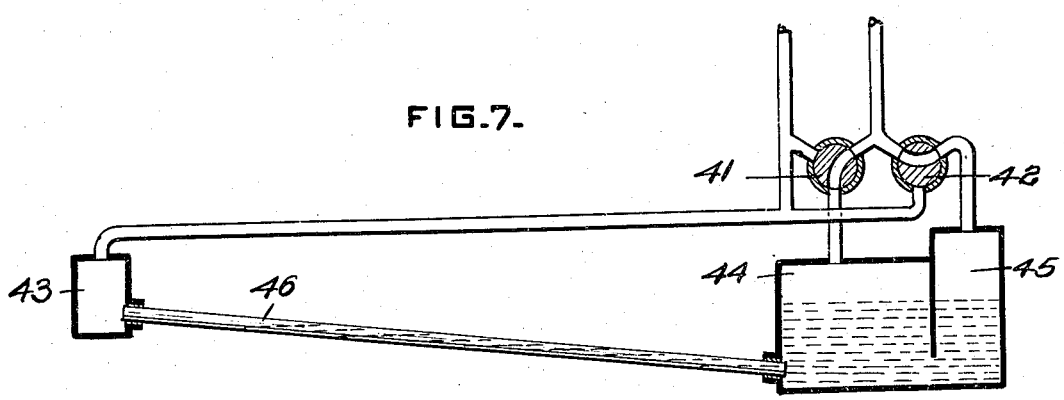
Figure 8:
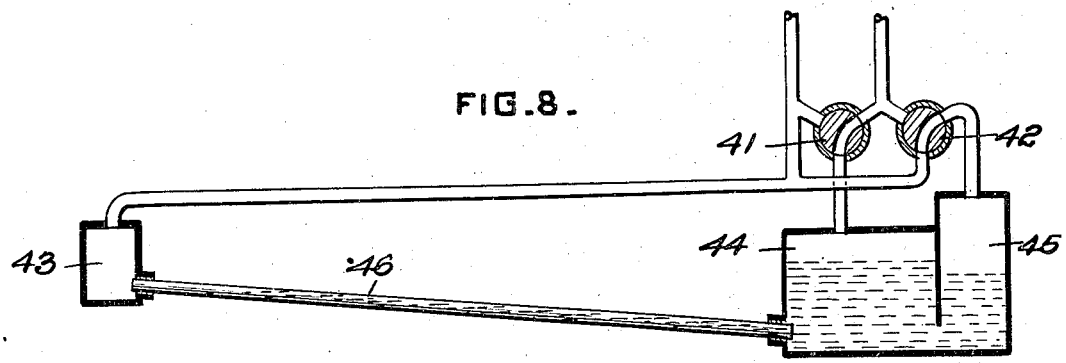
Figure 9:
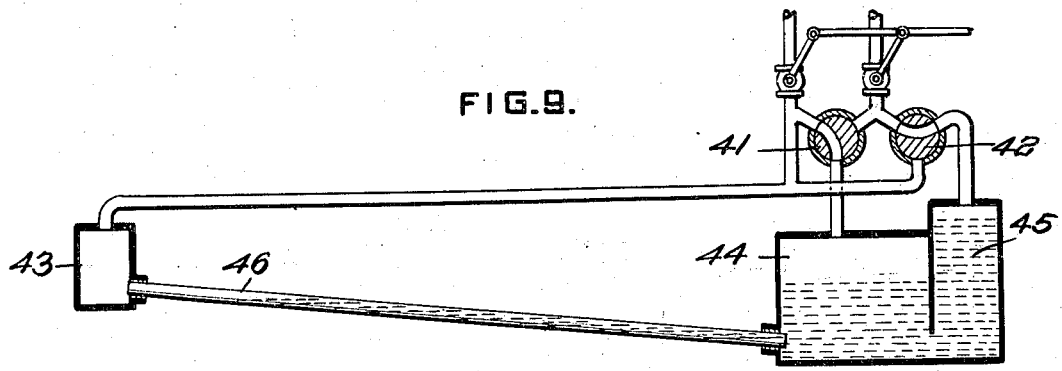

Referring now to the drawings;

Figure 1 illustrates in diagrammatic form one of the simplest types of the invention. Figs. 2, 3 and 4 similarly show in diagrammatic form several embodiments of the invention. Figs. 5 and 6 illustrate a gauge with one form of valve applied thereto in two different positions, and with two different scales. Figs. 7, 8 and 9 are other views showing a different valve arrangement, and with the valve in three different positions, giving three pressure ranges. Figs. 10 to 14 indicate still another valve arrangement. Figs. 15, 16 and 17 illustrate another construction with the parts in three different positions of adjustment. And Figs. 18 to 20 show another modification in which the invention is applied to measuring pressure in connection with a float and recording mechanism.

It will be necessary to go into detailed description only as to a limited number of the constructions illustrated, the operation and construction of other forms based upon the same principle being readily apparent to those skilled in the art from inspection and a brief description only. The constructions are illustrated and described for the most part as used in connection with flow meters for measuring gases but may be used for measuring liquids as well or as pressure gauges.

Referring to Fig. 1, the numeral 1 indicates the inclined gauge tube of glass or other suitable transparent material along which may be arranged a plurality of suitable scales, two only of which (scale *a* above and *b* below) are illustrated; 2 and 3 are tubes leading to different sources of pressure, the higher pressure being designated for convenience as plus pressure and the lower as minus pressure, although either or both may be above or below atmospheric pressure, it being desired to get an indication or reading of the difference of pressure from the gauge tube. These tubes 2 and 3 are connected by means of the tubes 4, 5, 6 and 7 with the upper end of the gauge tube 1 and the chambers or reservoirs 8 and 9, the two chambers being separated by the partition 10 but in communication below the lower edge of such partition.

The chambers 8 and 9 are of different cross section. By way of illustration, the areas may be in the relation of 9 to 1, and the cross section of the gauge tube 1 is one fifth that of the chamber 9. Valves 11, 12, 13, and 14 control the application of pressures from the pipes 2 and 3.

The extent of movement of the liquid in the gauge tube 1 when differential pressure is applied to the upper end thereof and to the chambers with which the lower end of the tube is connected, will of course be proportional to the relative cross sectional areas of the gauge tube and chambers to which the pressures are applied. The greater the cross sectional area of the chambers as opposed to that of the gauge tube, the greater the movement in the gauge tube for each unit of difference in pressure. When the differences in pressure to be measured are low it will be desirable to get a maximum movement in the gauge tube per unit of differential pressure, and the minus (or lower) pressure will be applied to the two chambers 8 and 9 in opposition to the plus (or higher) pressure applied to the upper end of the gauge tube. This condition is secured in the construction of Fig. 1 by closing the valves 11 and 12 and opening the valves 13 and 14. Under these conditions the upper scale $a$ is used.

On the other hand, if the differences in pressure to be measured are a maximum, the minus pressure will be applied only to the chamber 9 while the plus pressure is applied to the upper end of the gauge tube, this being accomplished by closing the valves 11, 12 and 13 and opening the valve 14. At this time, the lower scale $b$ will be used. It will be understood that the illustrated unit divisions in scales $a$ and $b$ are not at all relatively accurate.

The following table indicates the different arrangements which may be made for securing varying ranges of movement in the gauge tube, such table including the two examples already stated:

(1) Leg 1 against legs 8 plus 9.
(2) Leg 1 against leg 8.
(3) Leg 1 against leg 9.
(4) Legs 1 plus 9 against leg 8.
(5) Legs 1 plus 8 against leg 9.

It is obvious that by the addition of other chambers with suitable connections and valves, the range of movements of the liquid in the gauge glass might be widely amplified, but the foregoing is sufficient to illustrate the principle involved. Where a large number of ranges are employed in a single instrument the scales may be changed to suit the conditions.

Fig. 2 illustrates a construction in which a plurality of ranges of movement in the gauge glass 15 are secured, such ranges being indicated by the scales $c$, $d$, $e$. The tube 16 is adjustable vertically in the chamber 17, the lower of the differential pressures being applied to such tube 16 while the higher pressure is applied to the tube 18 at the upper end of the gauge tube. When the parts are in the position shown, the movement of the liquid in the gauge tube is greatest and the scale $c$ is employed. At this time the cross sectional area of the chamber 17, as opposed to that of the gauge tube governs the extent of movement of the liquid in the gauge tube. If the tube 16 is now moved down close to the liquid in the chamber 17 the scale $e$ is brought into use, the first part of such scale corresponding to that of the scale $c$ and the second part being composed of shorter units. The cross sectional area of the chamber 17 governs the extent of movement of the liquid in the gauge tube, until the level of the liquid in the chamber 17 reaches the end of the tube 16, after which the movement of the liquid in the gauge tube for unit of change in pressure is reduced in proportion to the reduction of the sectional area of the tube 16 as compared with the chamber 17, so that that portion of the scale $e$ having the shorter units comes into play.

The third scale, $d$, has its unit lengths the same as the shorter lengths of scale $e$, and such scale is employed when the tube 16 is moved down to such an extent that the lower end thereof constantly extends below the surface of the liquid in chamber 17.

Fig. 3 illustrates a modification of the construction of Fig. 2 in that the tube 19 has two sections 20 and 21 of different cross sectional area. The ranges correspond to those of Fig. 2 with two additional ones. The first of these additional readings is secured with the tube 19 lowered so that the end of the section 20 is just above the level of the liquid, and the second when the tube is lowered still further so that the end of the section 20 is below the level of the liquid. The chamber 22 and inclined gauge tube 23 correspond in construction to similar parts in Fig. 2 and suitable scales (not shown) will be employed as in the other construction.

Fig. 4 illustrates a modification in which two liquids 24 and 25 of different specific gravities, such as mercury and water are employed, the liquid 24 being the mercury and 25 being the water. The gauge glasses 26 and 27 indicate the levels of the mercury and water respectively, $f$ being the scale for the glass 26 and $g$ the scale for the glass 27. The opening 28 between the chambers 29 and 30 is closed by the valve 31, when the level of the mercury is raised to a point just below the lower end of the tube 27, such closing movement being caused by the float 31ª. This stops the movement of the water 25 and the higher pressures are then observed upon the lower gauge glass 26. The device is thus provided with measuring ranges for high and low pressures, a very heavy liquid being preferably employed for the high pressures and a very light one for the low pressures.

Figs. 5 and 6 illustrate an arrangement for giving two ranges, one for high and one for low pressure, with a single valve or three way cock 32 for shifting from one range to the other. When the valve is in the position of Fig. 5, the plus pressures are applied to chambers 33 and 34 and the minus pressure to chamber 35, thus giving the high pressure range in the glass 36. The low pressure range is secured when the valve is shifted to the position of Fig. 6 at which time the plus pressure is applied to chamber 33 and the minus pressure to chambers 34 and 35. The pipes 37 and 38 may be provided with valves 39 and 40 linked together, as illustrated to give simultaneous opening for use when velocity readings are to be taken, such valves being kept closed until the valve 32 is positioned.

Figs. 7, 8 and 9 illustrate an arrangement giving three ranges for low, medium and high pressures. The low pressure range is secured with the valves 41 and 42 in the positions of Fig. 7, with the chamber 43 connected to the plus pressure and the chambers 44 and 45 with the minus pressure, the glass 46 being provided with a suitable scale. The adjustment of Fig. 8 gives the medium range, the plus pressure being applied to the chambers 43 and 45 and the minus pressure to the chamber 44. Fig. 9 shows the valves in position to give the high pressure range, the chambers 43 and 44 being supplied with the plus pressure and the chamber 45 with the minus pressure.

Figure 10:
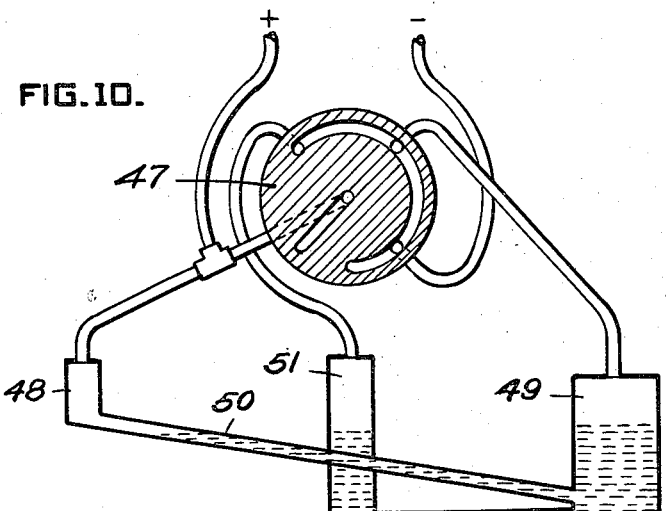
Figure 13:
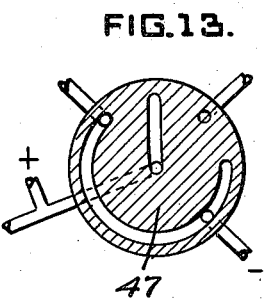
Figures 11, 12:
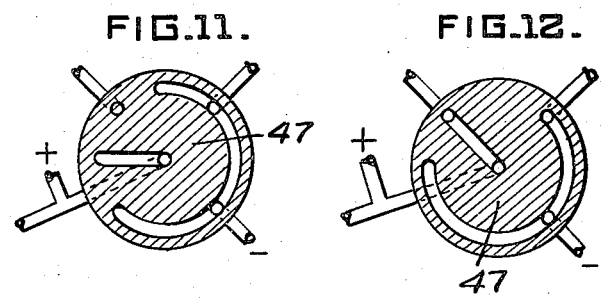
Figure 14:
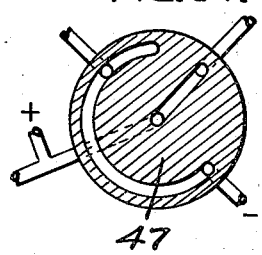
Figure 15:
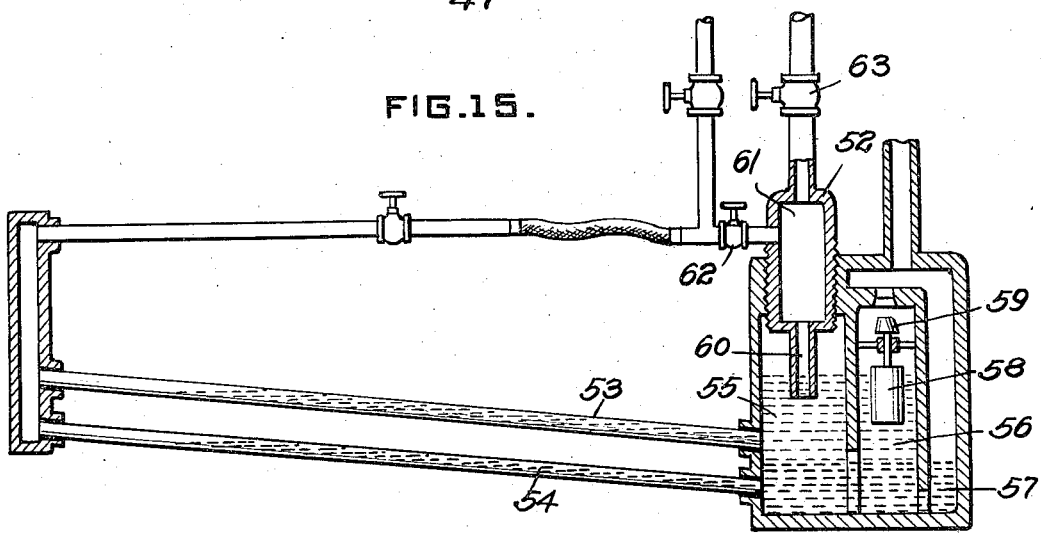

Figs. 10, 11, 12, 13 and 14 illustrate the substitution of a single valve 47 for the two valves of the Fig. 7 construction, so arranged as to give five ranges. In the position of Fig. 10, the low pressure range is secured, the plus pressure being applied to the chamber 48 and the minus pressure to the chambers 49 and 51, giving a reading on the glass 50. Fig. 11 indicates the position of the valve 47 for the next range, the plus pressure being applied to the chamber 48 and the minus pressure to the chamber 49. The next pressure range is secured with the valve in the position of Fig. 12, at which time the plus pressure is connected to chambers 48 and 51 and the minus pressure to the chamber 49. Fig. 13 indicates the valve position for the next range, the plus pressure being applied to the chamber 48 and the minus pressure to the chamber 51. Fig. 14 shows the valve in position for use with the highest pressure range, the plus pressure being applied to chambers 48 and 49 and the minus pressure to the chamber 51. This constitutes one of the simplest and most practical applications of the invention.

Figs. 15, 16 and 17 illustrate a structure constituting a combination of the features of Figs. 2, 3 and 4 and involves an application of all the principles of all the structures heretofore illustrated and described. In this structure, the two liquids of the Fig. 4 construction are employed in conjunction with the float operated valve; also a vertically adjusted member 52 constituting a modification of those shown in Figs. 2 and 3.

In this device, two inclined gauge glasses 53 and 54 are employed for use respectively with water or oil and mercury lying in layers in the chambers 55, 56 and 57. A float 58 is provided in the chamber 56 for operating the valve 59. The member 52 comprises two sections 60 and 61 and may be adjusted to occupy any one of the three different positions illustrated in Figs. 15, 16 and 17.

Referring to Fig. 15, the lower pressure range is secured by closing the valves 62 and 63 and applying the plus pressure to the tube 53 and the minus pressure to chambers 56 and 57, the valve 59 being open at this time as illustrated. The movement of the liquid in the glass 53 is now relatively great per unit change in differential pressure, and is measured by a suitable scale (not shown) along the glass. Before the level of the mercury has reached the bottom of the glass 53, the float closes the valve 59 and the measurement is shifted to the glass 54 carrying the mercury. At this stage the plus pressure applied to the upper end of the glass 54 is opposed to the minus pressure in the chamber 57. The movement per unit change in pressure is relatively low so that this adjustment or condition of the apparatus is suitable for measuring relatively high pressures.

A different adjustment of the ranges may be made with the parts still in the position of Fig. 15 by opening the valve 62 so that the plus pressure is applied to the tube 53 and section 60, the minus pressure being applied as before to the chambers 56 and 57. This gives an adjustment for measuring somewhat higher pressure ranges than the previous adjustment, since the liquid displaced by the plus pressure in the section 60 reduces the volume of the liquid withdrawn for the tube 53 by the upward movement of the level in the chamber 56. After the valve 59 is closed the measurement of the level of the mercury in the tube 54 occurs, the section of such tube being in opposition to the section of the chamber 57 to which the minus pressure is applied.

A third range is secured when the vessel 52 is adjusted downward to the position of Fig. 16 with the valves adjusted as in the preceding position, that is, with the plus pressure applied to the upper end of the gauge glass 53 and to the section 61 and with the minus pressure applied to the chambers 56 and 57. This gives a still higher measuring range than the preceding position since the amount of liquid in the section 61 displaced by the plus pressure is greater than that displaced in the section 60 in the preceding operation and the withdrawal from the tube 53 to raise the level in the chamber 56 correspondingly less. After the level in 56 has risen so as to close the valve 59, the measurement by the mercury in the tube 54 is the same as heretofore described.

A fourth range for still higher pressures is secured by adjusting the member 52 to the position of Fig. 17, at which time the entire area of the chamber or section 55 is exposed to the plus pressures, the raising and lowering of the level in such section and the tube 53 per unit of differential pressure is reduced to a minimum. The operation after the closing of the valve 59 and the shift to a measurement by the heavier liquid in the glass 54 follows the operation heretofore described, the movement of the heavier liquid in its glass being reduced to a minimum under these conditions with the plus pressure applied to the section 55.

Another measuring range may also be secured with parts in the position of Fig. 17, but with the section 61 open to the atmosphere and with plus pressure applied to the upper end of the gauge glass 53 and minus pressure applied to the chambers 56 and 57. A number of other combinations of the chambers might also be made if desired to secure still other ranges, but the foregoing is sufficient to illustrate the possibilities involved.

Fig. 18 indicates an application of the invention to a case in which a float device with suitable recording means takes the place of the indicating gauge glasses of the preceding embodiments of the invention the device being adapted to measure either pressures (compared with atmospheric) as opposed to the flow meter devices heretofore illustrated or to measure differential pressures when it is desired to use the device as a flow meter. In this construction, 64 is the float casing containing the liquid in which is mounted the float 65 guided upon the hollow rod 66. The float is provided with the usual pencil arm 67 extending upward to a position adjacent the recording drum 68. The casing 64 is divided by the partition 69 into two chambers 70 and 71 and the float is also divided into two chambers 72 and 73 of different cross sectional areas. Three pressure lines 74, 75 and 76 leading respectively to the chambers 70, 73 and 72 are provided, the chamber 71 above the float being connected with the negative or minus pressure through the hollow guide rod 66, when the device is used as a flow meter, said rod being open at its upper end.

The supply of fluid to the chambers 70, 71, 72 and 73 may be controlled by a valve 77 whose arrangement of parts and different positions are illustrated diagrammatically in Figs. 19 to 22. Plus pressure is applied to the valve through the passage 78, when the device is used as a flow meter in measuring differential pressures. When the device is used as a pressure meter and the pressure in opposition to the plus pressure is atmospheric, the connection 79 does not come into play and suitable communication between the chamber 71 and the atmosphere is provided. This may be conveniently accomplished by removing the gasket 80 at the upper end of the casing 64. The valve 77 is arranged to give four measuring ranges dependent upon its position, either when the chamber 71 is supplied with the minus pressure from the pipe 79 or when it is connected with the atmosphere. The valve is cored out as indicated at 81 in Figs. 19 to 22. The positions and ranges are as follows.

First, with the valve as shown in Fig. 19, the plus pressure from the pipe 78 is supplied to both the chambers 72 and 73 of the float through the pipes 75 and 76, thus giving a maximum movement of the float per unit of pressure.

Second, the valve is moved clockwise to the position of Fig. 20 which gives connection from the supply pipe 78 to the pipe 75 only, so that the plus pressure is applied to the chamber 73 only. The movement of the float per unit change of pressure is now less than with the valve in its preceding position.

Third, the valve is moved further clockwise to the position of Fig. 21, at which time the supply pipe 78 is connected by the pipe 76 to the chamber 72 only, and since the cross sectional area of this chamber is somewhat less than that of the chamber 73, the movement of the float per unit change of pressure is less than that secured when the valve is in the position of Fig. 20.

Fourth, the valve is moved still further in the clockwise direction to the position of Fig. 22, which gives a minimum movement of the float per unit change of pressure. When the valve is in this position the supply pipe 78 is connected to the pipe 74 leading to the chamber 70, and the movement of the float is secured by reason of the variations in the level of the liquid in the casing induced by the varying pressure applied to the relatively limited area of the surface of the liquid lying in the chamber 70.

What I claim is:

1. In combination in a gauge for measuring fluid pressure, a fluid pressure-responsive means, means to receive the same including a plurality of pressure legs of different cross sectional area bearing a definite relation to each other and having communication with the fluid of said means, connections for applying one of two fluid pressures, whose difference is to be measured, to a certain group of said legs, means whereby the application of such fluid pressures may be shifted so as to apply to certain legs of said group selectively, thus varying the range of said responsive means per unit of pressure, and connections for applying the other of the two said pressures to said responsive means through another of said legs outside of said group.

2. In combination in a gauge for measuring fluid pressures, a liquid indicating means, a gauge glass therefor, a chamber for the liquid communicating with the glass, an adjustable tubular member having a plurality of sections of different cross sectional area and opening downwardly into the liquid in said chamber, connections for applying pressure through said member, and means whereby the member may be adjusted up and down to vary the range of said indicating means in said glass per unit of pressure.

3. In combination in a gauge for measuring fluid pressures, liquid indicating means, a transparent tube carrying said liquid indicating means, a chamber containing a liquid in communication with the liquid of said indicating means, a pressure leg of cross section different from that of said chamber extending through the top of the chamber and adjustable vertically therein so that its lower end may be either above the surface of the liquid of the chamber or below the surface thereof, and means for applying fluid pressure through said pressure leg.

4. In combination in a gauge for measuring fluid pressures, an inclined gauge glass, a plurality of pressure legs or chambers of different cross sectional area bearing a definite relation to each other and containing a liquid having communication with the lower end of the gauge glass, means for applying one of two fluid pressures whose difference is to be measured to said legs, means whereby the application of such fluid pressure may be shifted so as to apply to such legs selectively thus varying the range of movement of the liquid in the gauge per unit of pressure, and connections for applying the other of two said pressures to the upper end of the gauge glass.

5. In combination in a gauge for measuring fluid pressures, an inclined gauge glass, a plurality of pressure legs or chambers of different cross sectional area bearing a definite relation to each other and containing a liquid having communication with the lower end of the gauge glass, means for applying fluid pressure to be measured to said legs, and means whereby the application of such fluid pressure may be shifted so as to apply to such legs individually or in combination, thus varying the range of movement of the liquid in the gauge glass per unit of pressure.

6. In combination in a gauge for measuring fluid pressures, an inclined gauge glass, a plurality of pressure legs or chambers of different cross sectional area having a definite relation to each other and containing a liquid having communication with the lower end of the gauge glass, means for applying the higher of two differential pressures to be measured to the upper end of the gauge glass, means for applying the lower of said pressures to one of said legs, and means whereby such fluid pressure may be shifted from one leg to another thus varying the range of movement of the liquid in the gauge per unit of differential pressure.

7. In combination in a gauge for measuring fluid pressures, an inclined gauge glass, a plurality of pressure legs or chambers of different cross sectional area having a definite relation to each other and containing a liquid having communication with the lower end of the gauge glass, means for applying the higher of two differential pressures to be measured to the upper end of the gauge glass, means for applying the lower of said pressures to one of said legs, and means whereby such fluid pressure may be shifted from one leg to another or to various combinations of the legs thus varying the range of movement of the liquid in the gauge per unit of differential pressure.

8. In combination in a gauge for measuring fluid pressures, a fluid pressure-responsive means, means to receive the same including legs of different cross sectional area having communication with the fluid of said means, a connection for applying one of two fluid pressures, whose difference is to be measured, to one leg so as to tend to move the responsive means in one direction, other communicating means for applying the other of said fluid pressures to the other legs so as to tend to move the responsive means in the reverse direction, and means whereby said last pressure may be shifted so as to apply to said other chambers selectively or in combination.

9. In combination in a gauge for measuring fluid pressures, a pair of gauge glasses, a pressure leg or chamber communicating with the lower end of both glasses at different levels respectively, two liquids in the chamber of different density with that of greater density having its level between the lower ends of the glasses, and the lighter liquid lying upon the heavier liquid with its surface above the level of the lower end of the upper glass, and means for applying differential pressures to be measured to the upper ends of the two glasses and to said pressure leg or chamber.

10. In combination in a gauge for measuring fluid pressures, a pair of gauge glasses, a pressure leg or chamber communicating with the lower end of both glasses at different levels respectively, two liquids in the chamber of different density with that of greater density having its level between the lower ends of the glasses, and the lighter liquid lying upon the heavier liquid with its surface above the level of the lower end of the upper glass, means for applying differential pressures to be measured to the upper ends of the two glasses and to said pressure leg or chamber, and means whereby the upward movement of the lighter liquid may be checked after such movement has progressed a predetermined distance, and the measuring action shifted to the movement of the heavier liquid in its gauge glass.

11. In combination in a gauge for measuring fluid pressures, a pair of gauge glasses, a pair of pressure legs or chambers, one of which communicates with the lower end of both glasses at different levels respectively, two liquids in the chambers of different density with that of greater density having its level between the lower ends of the glasses, and the lighter liquid lying upon the heavier liquid with its surface above the level of the lower end of the upper glass, a communication between the two chambers below the level of the denser liquid, means for applying differential pressures to the upper ends of the two glasses and to the two chambers or legs above the surface of the liquids therein, and means whereby the upward movement of the lighter liquid is checked after such movement has progressed a predetermined distance thus shifting the measuring action to the movement of the heavier liquid in its glass.

12. In combination in a gauge for measuring fluid pressures, a pair of pressure legs or chambers, one of which communicates with the lower end of both glasses at different levels respectively, two liquids in the chambers of different density with that of greater density having its level between the lower ends of the glasses, and the lighter liquid lying upon the heavier liquid with the surface above the level of the lower end of the upper glass, a communication between the two chambers below the level of the denser liquid, means for applying differential pressures to the upper ends of the two glasses and to the two chambers or legs above the surface of the liquids therein, a valve for cutting off the pressure connection to the chamber containing the two liquids, and automatic means for closing such valve after the upward movement of the liquid in the chamber has progressed a predetermined distance.

13. In combination in a gauge for measuring fluid pressures, a pair of gauge glasses, a pair of pressure legs or chambers, one of which communicates with the lower end of both glasses at different levels respectively, two liquids in the chambers of different density with that of greater density having its level between the lower ends of the glasses, and the lighter liquid lying upon the heavier liquid with its surface above the level of the lower end of the upper glass, a communication between the two chambers below the level of the denser liquid, means for applying differential pressures to the upper ends of the two glasses and to the two chambers or legs above the surface of the liquids therein, a valve for cutting off the pressure connection to the chamber containing the two liquids, and a float carried by the lighter liquid in said chamber and connected to the valve and adapted to close such valve after the liquid in the chamber has moved upward a predetermined distance.

In testimony whereof, I have hereunto subscribed my name this 11th day of March, 1921.

HERMAN BACHARACH.